March 2, 1965     W. F. ROOS     3,171,643
MULTI-STAGE PNEUMATIC SPRING
Filed Oct. 23, 1963

United States Patent Office 3,171,643
Patented Mar. 2, 1965

3,171,643
MULTI-STAGE PNEUMATIC SPRING
Wilfried Ferdinand Roos, Guls (Mosel), Germany, assignor to Stabilus Industrie- und Handelsgesellschaft m.b.H., Koblenz-Neuendorf, Germany
Filed Oct. 23, 1963, Ser. No. 318,210
7 Claims. (Cl. 267—65)

The invention relates to a multi stage pneumatic spring which can be used for example as shock absorber for a motorcycle. The characteristic line of such shock absorbers should at the commencement have a fairly flat and as far as possible linear course, and rise relatively steeply at a certain point in the compression thereof, if possible without an abrupt transition.

Such a characteristic line is achieved in a multi-stage pneumatic spring due to the fact that according to the invention as displacement piston for the first stage there is provided a second pneumatic spring or an assembly of a plurality of pneumatic springs arranged in telescopic fashion, the outward thrust force of the first stage being smaller than the outward thrust forces of the following stages, which also are different from one another. By virtue of this measure it is possible to adapt the characteristic line of a pneumatic spring by variation of the internal pressure of the individual stages and of the stroke distances allocated thereto within wide limits to the requirements in every case.

Figure 1:
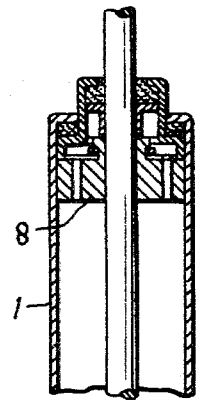
Figure 1:
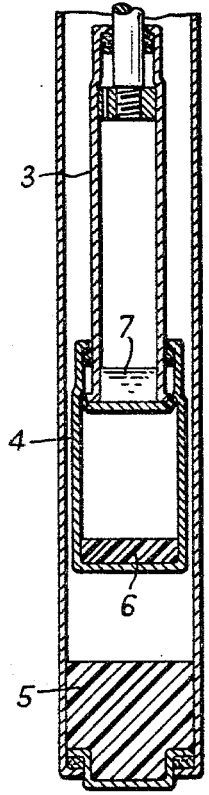
Figure 2:
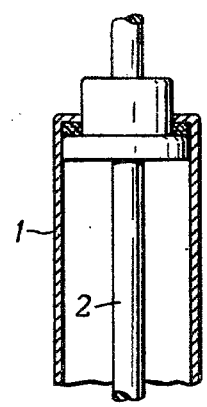
Figure 2:
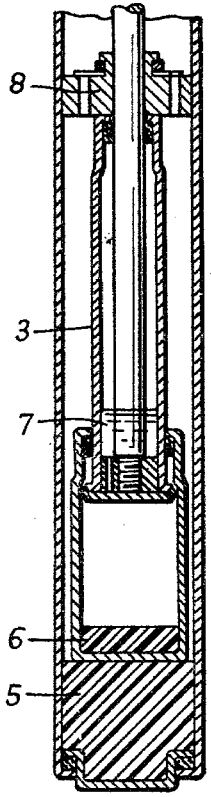
Figure 3:
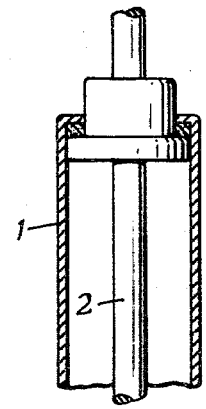
Figure 3:
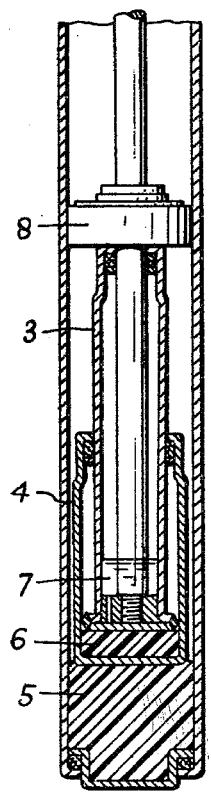

An example of embodiment according to the invention is represented diagrammatically in the drawings, wherein:
FIGURE 1 shows the extended position;
FIGURE 2 shows the retracted stages 1 and 2; and
FIGURE 3 shows all stages in the retracted position.

The piston rod 2 is introduced in pressure-tight and axially displaceable fashion at one end of the main pressure cylinder 1. At its end extending into the pressure cylinder 1 there is arranged an assembly of two pneumatic springs comprising subsidiary cylinders 3 and 4 within the main cylinder. The piston rod 2 serves as a displacement piston for the pneumatic spring 3 and the latter as displacement piston for the pneumatic spring 4. At the bottom of the pressure cylinder 1 and of the pneumatic spring 4 there are arranged elastic stops 5 and 6, while the lower region of the pneumatic spring 3 is filled with shock-absorption fluid 7.

The gas pressures in the pressure cylinder 1 and the pneumatic springs 3 and 4 are so adapted to one another that on axial loading the piston rod 2 with the assembly consisting of pneumatic springs 3 and 4 and acting as a displacement piston penetrates into the pressure cylinder 1 until the pneumatic spring 4 abuts against the elastic stop 5. This movement can be damped by the arrangement of a piston 8 on the piston rod 2. When the axial pressure upon the piston rod 2 increases, the latter now dips into the pneumatic spring 3, the stroke movement in the last range being braked by the shock-absorption fluid 7. On further increase of load the pneumatic spring 3 dips as a displacement piston into the pneumatic spring 4, the retraction movement being limited by the elastic stop 6 at the bottom of the pneumatic spring 4.

A further increase of the spring load must be taken up by the elastic stops 5 and 6. In place of the hydraulic shock-absorption fluid 7 in the pneumatic spring 3 an elastic stop can be arranged also in the case of this stage. Similarly it is possible, in place of the elastic stop 6, to provide hydraulic damping also in the pneumatic spring 4. Under certain circumstances it is further advantageous to combine the elastic stops with hydraulic damping.

I claim:
1. A multi-stage pneumatic spring, comprising a main gas cylinder containing gas at high pressure, a piston rod slidable through one end of the main gas cylinder, a damping piston fixed on the piston rod and slidably engaging the main gas cylinder, at least one interior sealed gas container telescopically carried by the piston rod within the cylinder, the resistance to telescoping of the damping piston into the cylinder being less than the resistance to telescoping of any such gas container.

2. A multi-stage pneumatic spring, comprising a main gas cylinder containing gas at high pressure, a piston rod slidable through one end of the main gas cylinder, a first piston fixed on the piston rod and slidably engaging the main gas cylinder, an interior sealed gas container containing gas under pressure and telescopically carried by the piston rod within the cylinder, a second piston fixed on the piston rod and slidably engaged in said interior gas container, the resistance to telescoping of the first piston into the cylinder being less than the resistance to telescoping of the second gas container.

3. A multi-stage pneumatic spring, comprising a main gas cylinder containing gas at high pressure, a piston rod slidable through one end of the main gas cylinder, a first piston fixed on the piston rod and slidably engaging the main gas cylinder, a first interior sealed gas container containing gas under pressure and telescopically carried by the piston rod within the cylinder, a second piston fixed on the piston rod and slidably engaged in said interior gas container, the resistance to telescoping of the first piston into the cylinder being less than the resistance to telescoping of the second gas container, and at least one further interior sealed gas container telescopically carried by the first interior gas container and containing gas under pressure.

4. A pneumatic spring as claimed in claim 1 having resilient stop means in the main gas cylinder at the end of the main gas cylinder opposite to the piston rod for engagement by the sealed gas container.

5. A multi-stage pneumatic spring as claimed in claim 3 having resilient stop means in the main gas cylinder at the end thereof opposite to the piston rod and resilient stop means in at least one of the interior gas containers.

6. A pneumatic spring as claimed in claim 2 having a first resilient stop means in the end of the cylinder opposite to the piston rod for engagement by the said second gas container, and a second resilient stop means located in said second gas container for engagement by said first gas container.

7. A pneumatic spring as claimed in claim 3 wherein at least one of the interior gas containers is provided with liquid damping means.

References Cited by the Examiner
UNITED STATES PATENTS

| | | | |
|---|---|---|---|
| 1,576,152 | 3/26 | Staats-Oles | 267—65 |
| 2,644,529 | 7/53 | Baker | 267—1 |
| 2,644,530 | 7/53 | Baker | 267—1 |
| 2,856,035 | 10/58 | Rohacs | 188—100 |
| 2,998,264 | 8/61 | Stump | 267—65 |
| 3,017,172 | 1/62 | Hartel | 267—64 |
| 3,046,000 | 7/62 | Polhemus et al. | 267—35 |

EUGENE G. BOTZ, Primary Examiner.

ARTHUR L. LA POINT, Examiner.